United States Patent [19]

Normandin et al.

[11] Patent Number: 5,361,160
[45] Date of Patent: Nov. 1, 1994

[54] LARGE ANGLE BROADBAND MULTILAYER DEFLECTORS

[75] Inventors: Richard J. F. Normandin; Francoise Chatenoud, both of Ottawa; Michael Cada, Halifax, all of Canada

[73] Assignee: National Research Council of Canada, Ottawa, Canada

[21] Appl. No.: 854,900

[22] Filed: Mar. 20, 1992

[51] Int. Cl.⁵ .............................................. H03F 7/00
[52] U.S. Cl. .................................... 359/328; 385/131
[58] Field of Search ................. 359/328, 326; 385/131

[56] References Cited

U.S. PATENT DOCUMENTS 5,111,466 5/1992 Normandin et al. .................. 372/22
5,185,830 2/1993 Nishimoto ............................ 385/131

Primary Examiner—James W. Davie
Attorney, Agent, or Firm—Pascal & Associates

[57] ABSTRACT

An optical signal deflector comprising an optical signal waveguide formed of plural layers of optically non-linear semiconductor material, apparatus for launching a first optical signal in the waveguide in a first direction which is parallel to the layers, apparatus for applying a second optical signal to the waveguide in a second direction parallel to the layers but at an angle to the first direction, the thickness and indexes of refraction of the layers being predetermined to cause non-linear field contributions of the signals to add in phase in the far field, whereby a third optical signal is obtained having an angle of emission which is the three dimensional vector addition, at a harmonic sum frequency, of the first and second signals.

16 Claims, 5 Drawing Sheets

LARGE ANGLE BROADBAND MULTILAYER DEFLECTORS

FIELD OF THE INVENTION

This invention relates to optical multilayer structures and in particular to an optical signal deflector which can be used to separate multiple optical input wavelengths simultaneously both in space and wavelength.

BACKGROUND TO THE INVENTION

In U.S. patent application Ser. No.07/667,494 filed Mar. 11, 1991 and entitled "Optical Multilayer Structures for Harmonic Laser Emission", now U.S. Pat. No. 5,111,466 by R. J. F. Normandin et al, it was disclosed that two counter-propagating lights which are contained in an optical waveguide along a single dimension can interact and form a second harmonic optical signal which is emitted from the optical waveguide in a direction different from the single dimension, and thus can be detected outside the waveguide. The disclosed waveguide is formed of layers of semiconductor material having different indices of refraction. The thicknesses of the layers and their periodicity determine the bandwidth, and the relative wavelengths of the two input signals determine the angles of emission of the harmonic signal.

When the two guided fundamental wavelengths are identical, oppositely propagating and travelling in the same colinear one dimensional path, the radiated harmonic signal is observed in a direction perpendicular to the surface of the waveguide. When the two oppositely propagating optical signals are of differing wavelength, wavevector addition rules coupled with energy conservation rules dictate the angle of emission as well as the sum harmonic wavelength.

SUMMARY OF THE PRESENT INVENTION

We have discovered that if the two optical input signals are not colinear, the output angle is the three dimensional vector addition at the harmonic sum frequency of the two input vectors. Thus a new degree of freedom in fabrication of optical signal deflectors is obtained.

In accordance with an embodiment of the invention, an optical signal deflector is comprised of an optical signal waveguide formed of plural layers of optically non-linear semiconductor materials, apparatus for launching a first optical signal in the waveguide in a first direction which is parallel to the layers, apparatus for applying a second optical signal to the waveguide in a second direction parallel to the layers but at an angle to the first direction, the thickness and indexes of refraction of the layers being predetermined to cause non-linear field contributions of the signals to add in phase in the far field, whereby a third optical signal is obtained having an angle of emission which is the three dimensional vector addition at a harmonic sum frequency of the first and second signals.

In accordance with another embodiment, a tunable interconnect is comprised of a deflector as described above, apparatus for varying the wavelength of one of the first and second signals, a photodetector array positioned to receive the third signal at various angles relative to the deflector for receiving the third signal at a particular photodetector position depending on the angle of emission of the third signal, the angle of emission depending on the harmonic sum frequency.

In accordance with another embodiment, a space division optical demultiplexer is comprised of a deflector as described above, receive apparatus such as an opto-electric processor or an optical processor, positioned to receive the third signal at various angles relative to the axis of the deflector for receiving the third signal at a particular photodetector position depending on the angle of emission of the third signal, the angle of emission depending on the second direction.

BRIEF INTRODUCTION TO THE DRAWINGS

A better understanding of the invention will be obtained by reference to the detailed description below, in conjunction with the following drawings, in which:

FIG. 1 is an isometric view of an embodiment of the invention,

FIG. 2A is a graph of an output angle of a resulting harmonic signal vs an input angle of a second input signal relative to the angle of the first input signal, FIG. 2B is a graph of an output angle of a resulting harmonic signal vs rate of change of input angle of a second input signal relative to the angle of the first input signal, FIGS. 3A, 3B and 3C are isometric views of further embodiments of the invention, and FIGS. 4A, 4B and 4C are isometric views of still further embodiments of the invention.

DETAILED DESCRIPTION OF THE INVENTION

Figure 1:
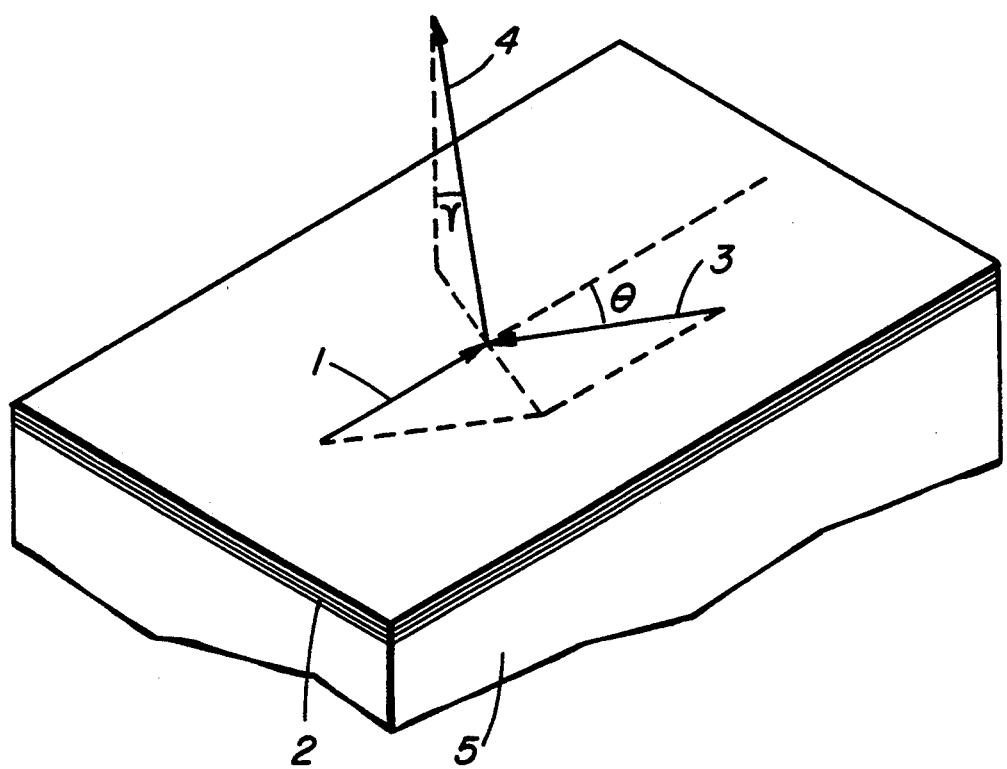

FIG. 1 is a diagram illustrating the concept of the invention. A first optical signal 1 is launched in a waveguide 2 which is formed of plural layers of optically non-linear semiconductor materials, the first optical signal being applied in a first direction which is parallel to the layers. A second optical signal 3 is applied to the waveguide in a second direction which is parallel to the layers, but at an angle $\theta$ to the first direction.

The thicknesses and indices of refraction of the layers are predetermined to cause non-linear field contributions of the signals to add in phase in the far field. As a result a third optical signal 4 is obtained, having an angle of emission $\gamma$ which is the three dimensional vector addition at the harmonic sum frequency of the first and second signals.

It is preferred that the waveguide layers should be disposed on a buffer layer (not shown) which is disposed on a substrate, the combined buffer layer and substrate layer being illustrated together as 5.

In order to achieve harmonic generation, all non-linear field contributions are to add in phase in the far field. This is achieved by modulating the phase of the radiating non-linear field by creating the regions of differing indices of fraction, in the layers of the waveguide 2.

Thus, assuming similar nonlinear coefficients for $Al_{0.7}Ga_{0.3}As$ and $Al_{0.9}Ga_{0.1}As$, a cross-section calculation may be performed. The buffer layer is also made of AlGaAs. The geometrical part of the interaction integral is approximated to be of the form, $$\langle S_{av}\rangle = \frac{1}{2}\Re(E_{top} \times H^*_{top}) \quad (1)$$

$$= \frac{1}{2}\omega^2\sqrt{\frac{\mu_o}{\epsilon_o}}\left(\frac{n}{n+1}\right)^2 SS^* y$$

with $$S = \int_{-\infty}^{o} \frac{p^{nl}(y')}{n(y')} \exp[-ik_o n(y') y'] \, dy' \quad (2)$$

Equation 2 reveals that with the exception of the $1/n(y')$ term, the overall radiated field is a Fourier transform of the polarization source term. Therefore, for a given film geometry, the resultant bandwidth can be tailored for specific applications by a suitable engineering of the thickness of refractive index. This is critical in applications where the two counter propagating guided fundamentals are of different wavelengths or in cases where a single layer stack is supposed to provide enhancement to a larger ensemble of output angles as is the case here.

When the propagating guided waves are of different frequencies and/or directions the harmonic plane wave emission is governed by the simultaneous requirements of momentum and energy conservation for the overall interaction. Taking in account wavevector matching and boundary conditions for electrical and magnetic optical fields the output direction $\gamma$ (FIG. 2A) can be evaluated for the harmonic field. This also can be done from a projection vector approach or through Snell's law of refraction at the various wavelengths and with the effective guided index. 1

$$\kappa = 2 k_\omega \sin\left(\frac{\theta}{2}\right) \quad (3)$$

where $\theta$ is the angle inside the waveguide between the two optical signal beams 1 and 2. With the harmonic sum wavelength being determined by the conditions explained in the abovenoted U.S. patent application and in U.S. Pat. No. 5,051,617 issued Sep. 24, 1991 (both of which are incorporated herein by reference) and thus being fixed by energy conservation, the output wavevector is determined as, $$k_{2\omega} = \frac{2\pi}{\lambda_\omega} \quad (4)$$

By simple geometry the output angle is symmetric to the incident vectors, as shown in FIG. 1 and tilted by, 1

$$\gamma = a\sin\left(\frac{\kappa}{k_{2\omega}}\right) \quad (5)$$

which, for a successful laboratory prototype waveguide at 1.06 μm yields. 1
2 3

$$\gamma = a\sin\left(3.053 \sin\left(\frac{\theta}{2}\right)\right) \quad (6)$$

Therefore the harmonic emission angle in terms of the outside fiber angle can be given by (for our system specifically), $$\gamma = a\sin\left(3.52 \sin\left(\frac{a\sin\left(\sin\left(\frac{\theta_{in}}{3.053}\right)\right)}{2}\right)\right) \quad (7)$$

with $$\gamma_{out} = a \sin(3.47 \sin(\gamma)) \quad (8)$$

Figure 2A:
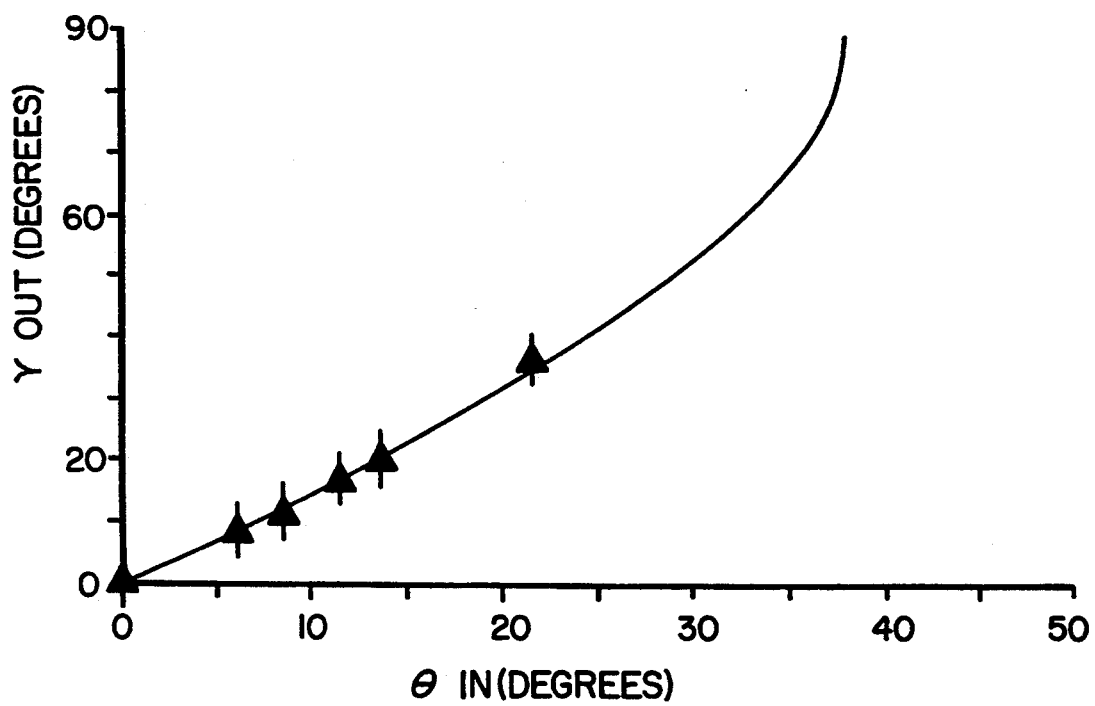

The theoretical curve for the inside angle in relation to the outside harmonic angle is plotted in FIG. 2A as the solid curve. From a fairly linear behaviour the curve deviates rapidly near the critical angle until the onset of total internal reflection. A small input variation will then give a huge angle scan to the output. The points plotted illustrate experimental data to be discussed below.

Figure 2B:
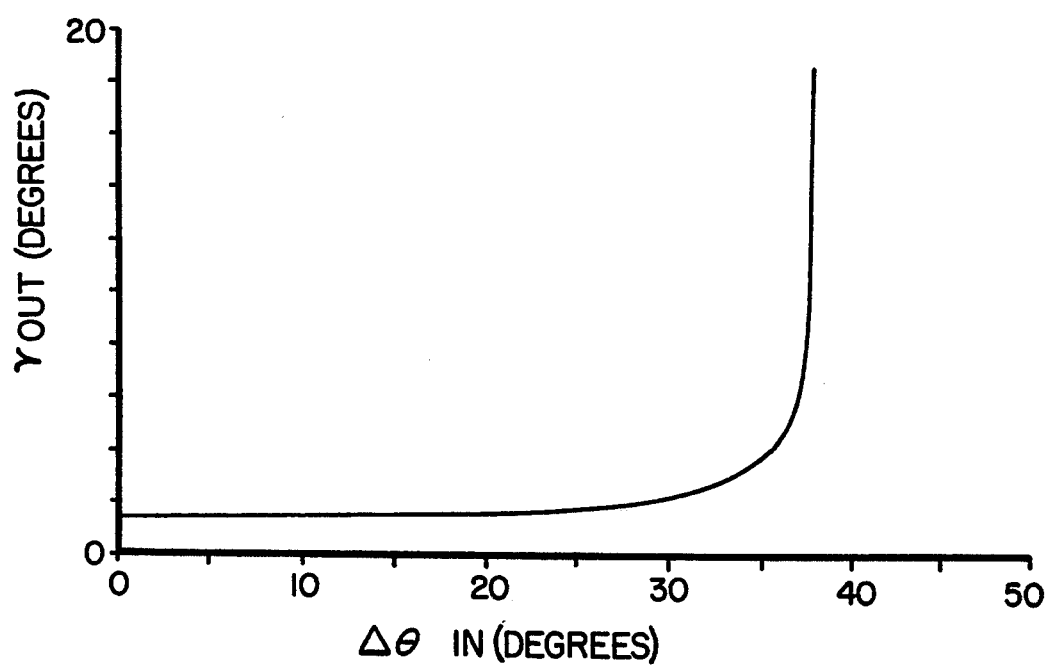

FIG. 2B is a plot of the scan achieved for a one degree input variation against the central input angle. The performance exceeds what has been achieved previous to this invention by optical scanners, as far as we know, by several orders of magnitude, the only exception being mechanically scanned optical scanners. The latter are, of course, very slow and prone to failures. They cannot address both position and wavelength as is the case here and certainly not in subpicosecond times.

By using a standard optical test bench the validity of non-collinear wave mixing in a waveguide geometry was tested. One set of experiments used a modest input angle $\theta$ of 17.5 degrees on one input while keeping the second input in the standard configuration. Referring to FIG. 1 we utilized the 30% reflection off the output face to provide a contra-propagating beam and therefore obtained a perpendicular harmonic beam off the waveguide surface in accordance with the prior art. This was monitored in the far field directly on a standard, real time, CCD camera off a TV monitor. When the second, non collinear, beam is present a second harmonic wavefront is then present. Knowing the CCD sensitive array size, focal length of the lens and distances the angular deviation was then computed. A similar measurement with a 27 degree input angle was then obtained in another set of experiments.

Multiple lines were observed due to the (110) substrate and semiconductor layer orientation. However it is preferred to use semiconductor layers with (111) orientation to obtain a single output line.

Sighting by eye, a small telescope and aperture set was used to make some measurements, which was straight forward since the harmonic field is easily seen by the unaided eye in a normally lit room. Deflection angles of up to ±40 degrees were easily seen.

The results noted of these experiments are already several orders of magnitudes better than achievable with present all-optical and electro-optical methods since typical prior art deflection angles are only of the order of a few tenths of degree.

A set of experiments using the present optical bench is shown against theory as the triangle data points plotted in FIG. 2A. Agreement with theory is quite noticeable, as predicted.

Multiple input wavelengths can be separated simultaneously both in space and wavelength at the output plane. Thus this device can be used as tunable and addressable free space interconnect apparatus as well as a beam deflector. Since the harmonic output is the product of the two propagating guided modes it is possible to impress the modulation of one channel to the other and also achieve time domain demultiplexing and switching simultaneously with the WDM functions thus realizing full bandwidth utilization as a detector/demultiplexing for fiber systems.

While manual adjustment of the input angles can be utilized, this can be done electro-optically. The tuning element cam be basically a small electro-optically induced prism which can deflect due to carrier injection. Its performance is quite sufficient to give large angle deflections when operated near a 36 to 38 degree incident angle as shown theoretically, which will result in the very wide output scan evident from FIG. 2B.

Figure 3A:
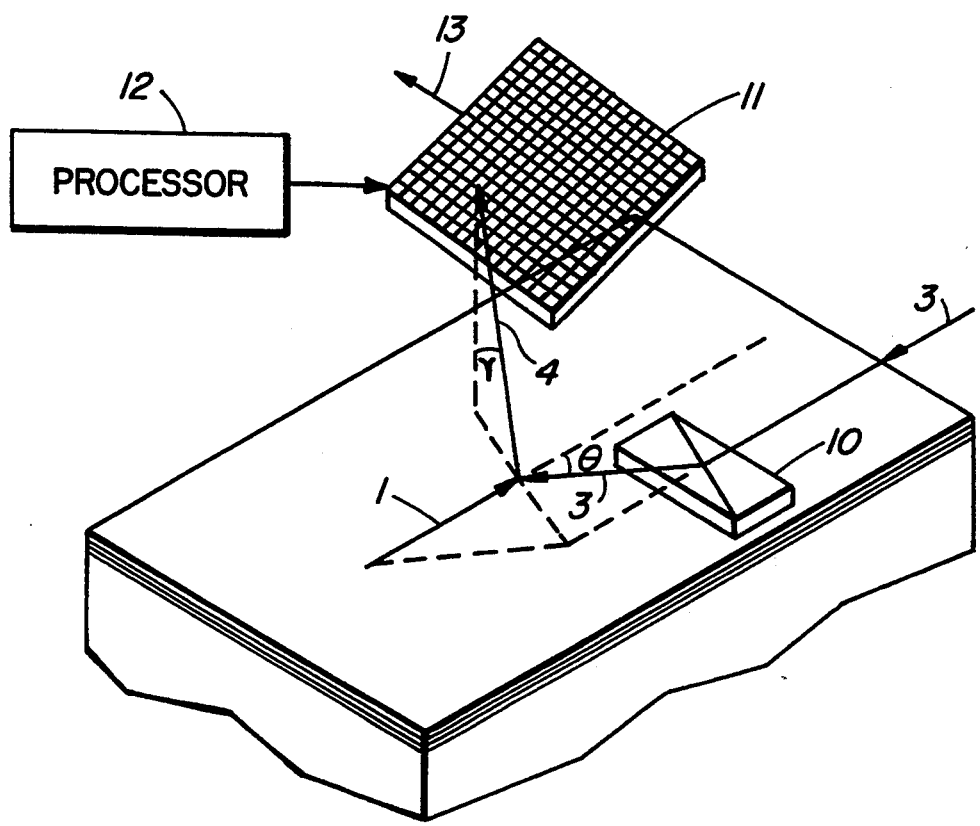

FIG. 3A illustrates an embodiment of the invention using the electro-optically induced prism 10. The prism is integrated with the waveguide structure described with reference to FIG. 1A, and reproduced in FIG. 3. It may be seen that the input optical signal 3 which is parallel to input optical signal 1 is deflected by prism 10 at angle $\theta$, and that angle may be changed electrically. Indeed, a third optical signal colinear and contrapropagating to input signal 1 (or additional signals at other angles) may additionally be used. That third signal may also be passed through a prism to interact with signal 1 at an optimum angle. By switching the prisms, the output signal 4 may be moved to subtend discrete angles $\gamma$. A photodetector array 11 disposed above the waveguide may be used to detect the output signal and its position, thus achieving a demultiplexing function.

Figure 3B:
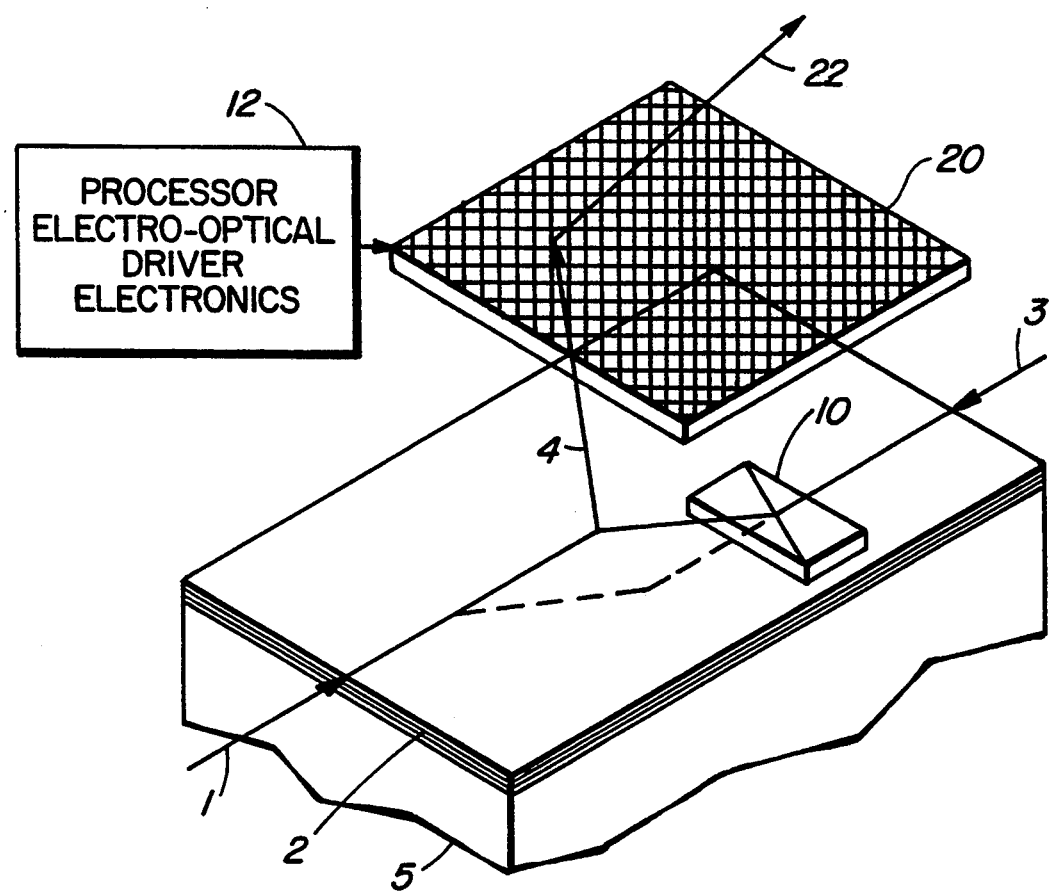
Figure 3C:
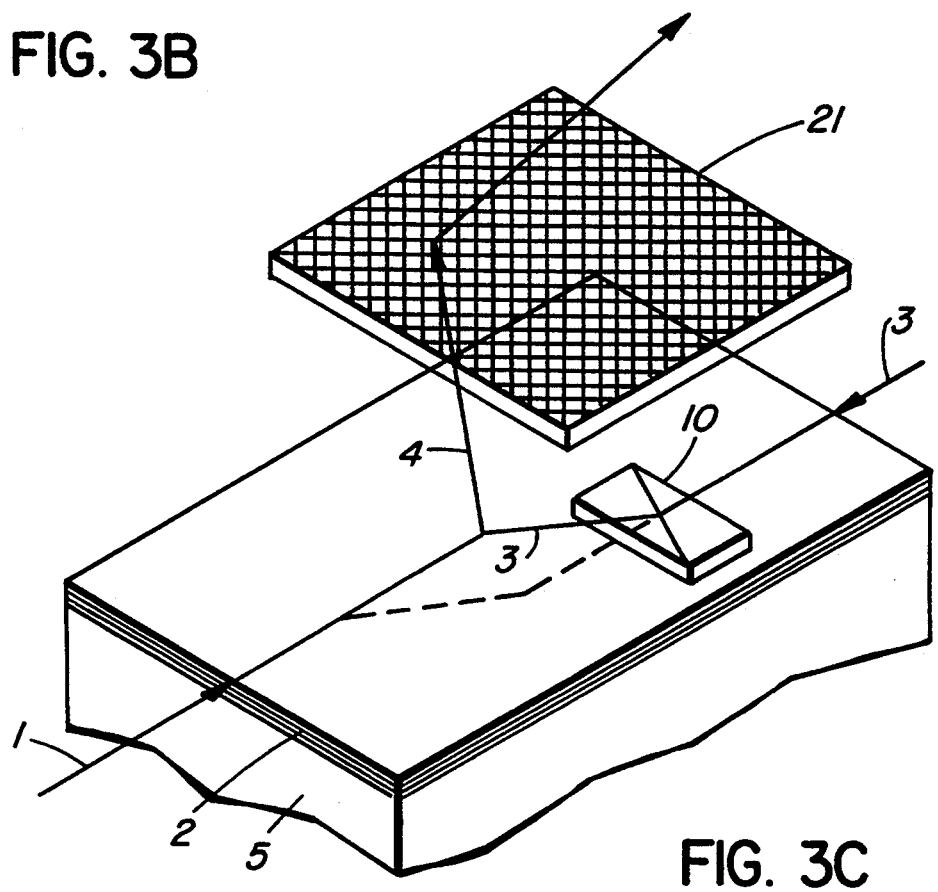

As illustrated in FIG. 3B, rather than using a photodetector array 11, another type of electro-optic plane 20 or other form of electro-optic or purely optical receiver-processor may be used. In the case of a purely optical receiver-processor, the light beam may be further deflected, by optical processor 21, as shown in FIG. 3C, creating a multiple stage deflector.

It may thus be seen that signals of similar wavelength interacting at different angles result in a particular harmonic output wavelength which may be detected at different angular positions relative to an angle orthogonal to the plane of the waveguide. By using different input signal wavelengths which interact at a fixed angle, the resulting different harmonics may be detected by the photodetector array at different angles relative to an angle orthogonal to the plane of the wave guide. By using combinations of different angles and different input wavelengths, space and wavelength division multiplexing and demultiplexing is achieved.

For example, if the photodetector array 11 is addressed, e.g. by processor 12, an output signal 13 is achieved. Thus the processor 12 controls selection of any of the multiple frequency and space divided harmonic signals resulting from the above-described deflection.

Figure 4A:
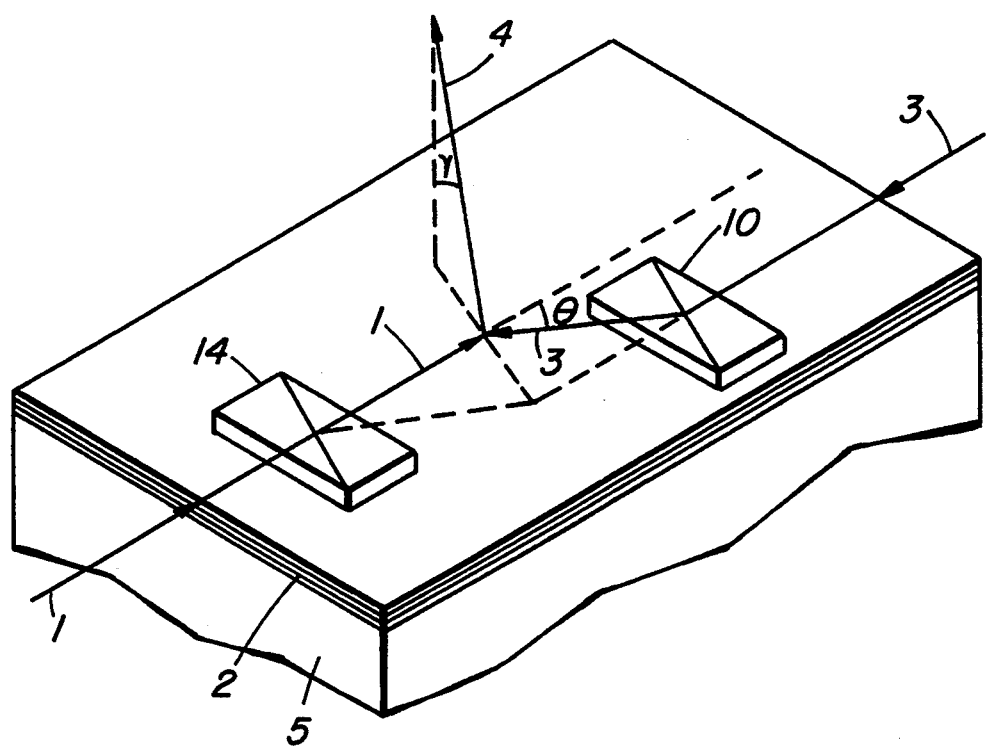

FIG. 4A illustrates a structure similar to FIG. 3A, with the addition of an electro-optically induced prism 14. Prism 14 is used to change the angle of the first input signal 1. In this case two electro-optical deflector prisms 14 and 10 are used to provide push-pull operation and wavelength compensation so that both wavelength and position can be simultaneously changed to reach any output position, which may be detected by array 11 or deflected by array 20 or 21 (not shown in FIG. 4 for the purpose of clarity).

Figure 4B:
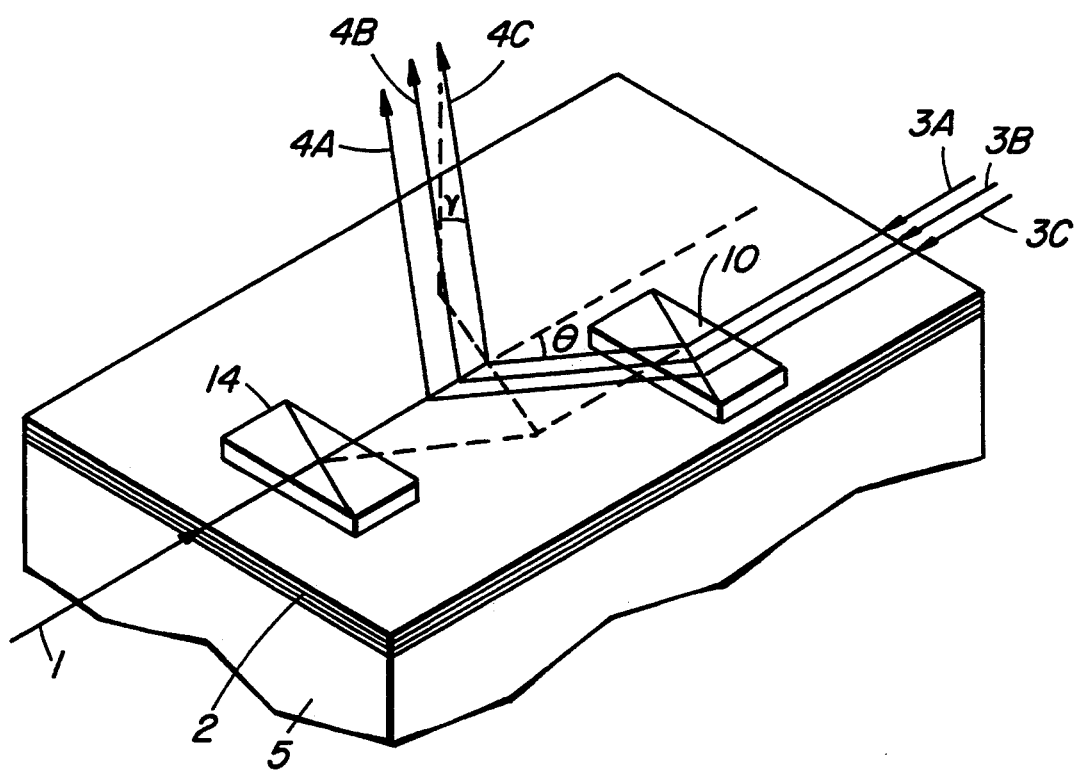
Figure 4C:
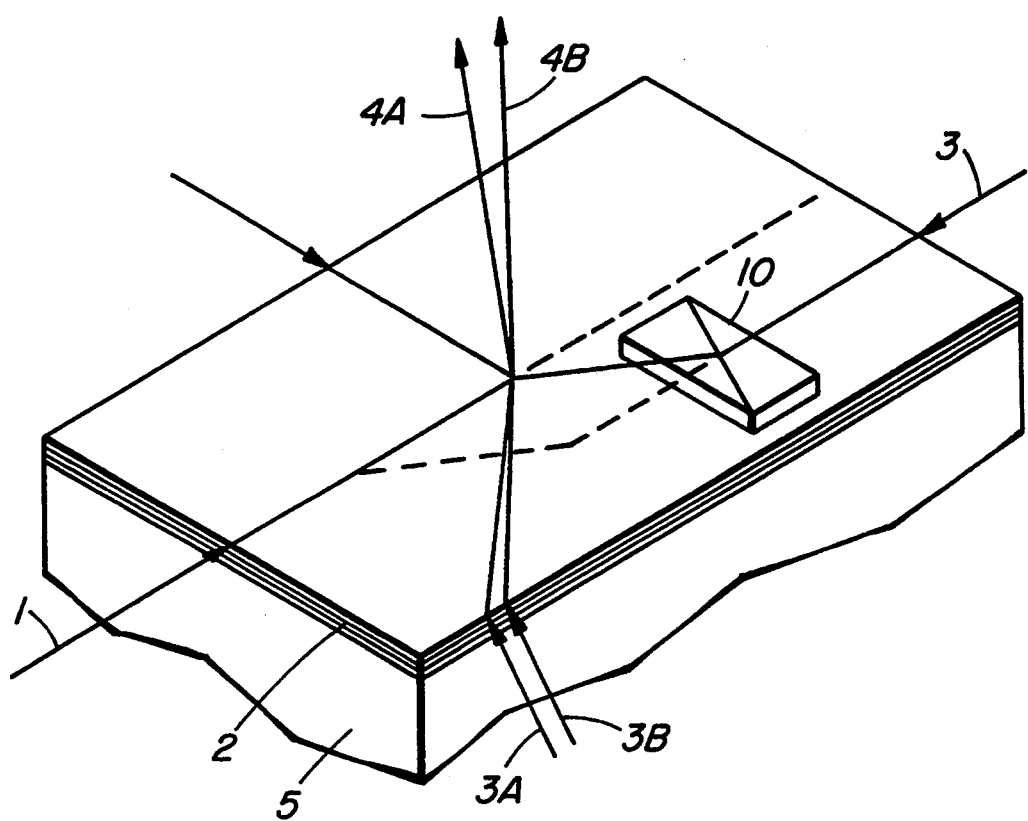

It should be noted that more than two input beams may be used as shown in FIGS. 4B and 4C. Three or more inputs may be used, applied and interacting at different angles for example all of which will contribute in determining the output beam position and wavelength. Therefore applications in nonlinear neural networks with weighting factors determined by control beams are feasible using this invention. Other geometries in optical interconnect and optical computing in spatial frames (or indeed both space and time in a simultaneous fashion) can be built. This amounts to spatial, wavelength and time domain (WDM-TM) multiplexing.

It should also be noted that information is conserved in the overall convolution and mixing operation. This is important for coherent optical fiber systems. Previously a local oscillator signal was mixed with the incoming coherent fiber signal onto a square law photodetector. The resultant signal then contained sidebands at microwave frequencies that are extracted by conventional electronic techniques. The same thing is achieved by the present invention since the nonlinear interaction is the product of the incoming and reference guided waves. The present invention however has the advantage of also being able to separate several "carrier" wavelengths at the same time, in time, space and frequency.

Large angle deflectors and signal processors for spatial optical interconnect have thus been achieved in the present invention. The control can be electro-optical as well as all-optical in the DC to subpicosecond time domain. The efficiencies are such that readily visible outputs can be achieved with mW average powers in a fiber optic context. While various materials may be used, the working principle is independent of the chosen material system.

A person understanding this invention may now conceive of alternative structures and embodiments or variations of the above. All of those which fall within the scope of the claims appended hereto are considered to be part of the present invention.

We claim:

1. An optical signal deflector comprising:
   (a) an optical signal waveguide formed of plural layers of optically non-linear semiconductor material,
   (b) means for launching a first optical signal in said waveguide in a first direction which is parallel to said layers,
   (c) means for applying a second optical signal to said waveguide in a second direction parallel to said layers but at an angle to said first direction,
   (d) the thickness and indexes of refraction of said layers being predetermined to cause non-linear field contributions of said signals to add in phase in the far field,
   whereby a third optical signal is obtained having an angle of emission which is the three dimensional vector addition, at a harmonic sum frequency, of said first and second signals.

2. An optical signal deflector as defined in claim 1 in which the locations and the thicknesses of the said layers and their refractive indices are chosen approximately according to the Fourier transform of the following equation:

$$S = \int_{-\infty}^{\infty} \frac{p^{NL}(y')}{n(y')} \exp[-ik_o n(y')y'] dy'$$

where $S^2$ is proportional to the radiated harmonic field, $p^{NL}(y')$ is a nonlinear polarization field induced by the waveguided fundamentals, $n(y')$ is the refractive index at position $y'$, and $k_o$ is the wave vector of the radiated field in air so as to provide the said multilayer structure with a predetermined interaction bandwidth.

3. An optical signal deflector as defined in claim 2 in which the refractive indexes of said semiconductor materials are different.

4. An optical signal deflector as defined in claim 3 in which said first and second signals have different wavelengths.

5. An optical signal deflector as defined in claim 3 including means for varying said second direction.

6. An optical signal deflector as defined in claim 5 in which said means for varying said second direction is comprised of an electro-optically induced prism.

7. An optical signal deflector as defined in claim 3 in which said waveguide is formed using semiconductor layers having (111) orientation.

8. An optical signal deflector as defined in claim 3 including means for applying at least a fourth optical signal to said waveguide in a direction parallel to said layers but at an angle to said first direction.

9. An optical signal deflector as defined in claim 8 in which the wavelength of said fourth signal is different from the wavelength of said second signal and the direction of said fourth signal is similar to that of said second signal.

10. An optical signal deflector as defined in claim 8 in which the wavelength of said fourth signal is the same as the wavelength of said second signal and the direction of said fourth signal is different from that of said second signal.

11. An optical signal deflector as defined in claim 8 in which both the wavelength and direction of said fourth signal are different from the wavelength and direction of said second signal.

12. A tunable interconnect element comprising a deflector as defined in claim 3, means for varying the wavelength of one of the first and second signals, a photodetector array positioned to receive said third signal at various angles relative to said deflector for receiving said third signal at a particular photodetector position depending on the angle of emission of said third signal, the angle of emission depending on said harmonic sum frequency.

13. A space division optical demultiplexer comprising a deflector as defined in claim 3, a photodetector array positioned to receive said third signal at various angles relative to said deflector for receiving said third signal at a particular photodetector position depending on the angle of emission of said third signal, said angle of emission depending on said second direction.

14. A demultiplexer as defined in claim 13, including means for addressing said photodetector array for selection and controlling output of a particular second signal from said array.

15. A tunable interconnect element comprising a deflector as defined in claim 3, means for varying the wavelength of one of the first and second signals, a opto-electric processor array positioned to receive said third signal at various angles relative to said deflector for receiving said third signal at a particular opto-electric processor position depending on the angle of emission of said third signal, the angle of emission depending on said harmonic sum frequency.

16. A space division optical demultiplexer comprising a deflector as defined in claim 3, a opto-electric processor array positioned to receive said third signal at various angles relative to said deflector for receiving said third signal at a particular opto-electric processor position depending on the angle of emission of said third signal, said angle of emission depending on said second direction.

* * * * *